United States Patent
Barnett et al.

(10) Patent No.: US 7,409,716 B2
(45) Date of Patent: Aug. 5, 2008

(54) SYSTEM FOR INTRUSION DETECTION

(75) Inventors: Bruce Barnett, Troy, NY (US); Scott Evans, Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 915 days.

(21) Appl. No.: 10/770,665

(22) Filed: Feb. 3, 2004

(65) Prior Publication Data

US 2004/0157556 A1    Aug. 12, 2004

Related U.S. Application Data

(60) Provisional application No. 60/445,579, filed on Feb. 7, 2003.

(51) Int. Cl.
 *G06F 11/00* (2006.01)
 *G06F 17/30* (2006.01)

(52) U.S. Cl. .................. 726/23; 726/22; 726/4

(58) Field of Classification Search ............... 726/26, 726/27, 30, 23, 22, 4
See application file for complete search history.

(56) References Cited

U.S. PATENT DOCUMENTS

| 6,046,988 | A  | 4/2000  | Schenkel et al. |
|-----------|----|---------|-----------------|
| 6,088,452 | A  | 7/2000  | Johnson et al.  |
| 6,301,660 | B1 | 10/2001 | Benson          |
| 6,321,338 | B1 | 11/2001 | Porras et al.   |
| 6,324,654 | B1 | 11/2001 | Wahl et al.     |
| 6,411,997 | B1 | 6/2002  | Dawes et al.    |
| 6,446,200 | B1 | 9/2002  | Ball et al.     |
| 6,484,203 | B1 | 11/2002 | Porras et al.   |
| 2002/0002686 | A1 | 1/2002 | Vange et al.   |
| 2002/0032880 | A1 | 3/2002 | Poletto et al. |
| 2002/0035628 | A1 | 3/2002 | Gil et al.     |
| 2002/0052942 | A1 | 5/2002 | Swildens et al. |
| 2002/0095492 | A1 | 7/2002 | Kaashoek et al. |
| 2002/0099816 | A1 | 7/2002 | Quarterman et al. |
| 2002/0103916 | A1 | 8/2002 | Chen et al.    |
| 2002/0120727 | A1 | 8/2002 | Curley et al.  |
| 2002/0138762 | A1 | 9/2002 | Horne          |
| 2002/0161755 | A1 | 10/2002 | Moriarty      |
| 2003/0009699 | A1 | 1/2003 | Gupta et al.   |
| 2003/0051032 | A1 | 3/2003 | Schenkel et al. |

OTHER PUBLICATIONS

Evans, S., Bush, S.F., and Hershey, J., Information Assurance through Kolmogorov Complexity, DARPA Information Survivability Conference & Exposition II, 2001, Proceedings vol. 2, pp. 322-331. 12.*
Quantum Kolmogorov complexity based on classical descriptions Vitanyi, P.M.B.; Information Theory, IEEE Transactions on vol. 47, Issue 6, Sep. 2001 pp. 2464-2479.*

(Continued)

*Primary Examiner*—David Y Jung
(74) *Attorney, Agent, or Firm*—David J. Zibelli; Prass & Irving, LLP

(57) ABSTRACT

A system a wireless ad hoc network. The system includes a plurality of nodes and a plurality of protocols for governing transmission of data between the plurality of nodes. The operation of the protocols is quantified by a complexity metric for determining whether an external source has altered the operation of the system.

13 Claims, 2 Drawing Sheets

OTHER PUBLICATIONS

Strongly Universal Quantum Turing Machines and Invariance of Kolmogorov Complexity Muller, M.; Information Theroy, IEEE Transactions on vol. 54, Issue 2, Feb. 2008 pp. 763-780.*

Computational power of neural networks: a characterization in terms of Kolmogorov complexity Balcazar, J.L.; Gavalda, R.; Siegelmann, H.T.; Information Theory, IEEE Transactions on vol. 43, Issue 4, Jul. 1997 pp. 1175-1183.*

"Computational Power of Neural Networks: A Characterization in Terms of Kolmogorov Complexity", J. L. Balcazar, R. Gavalda & H. T. Siegelmann, 1997 IEEE.

"A Complexity Theoretic Approach to Randomness", M. Sipser, M.I.T., 1983 ACM.

"Approximating the Smallest Grammar: Kolmogorov Complexity in Natural Models", M. Charikar, E. Lehman, D. Liu, R. Panigraphy, M. Prabhakaran, A. Rasala, A. Sahai & A. Shelat, 2002 ACM.

"Kolmogorov Learning for Feedforward Networks", R. Neruda, A. Stedry, J. Drksova, Institute of Computer Science of the Czech Republic, 2001 IEEE.

"Statistical Traffic Modeling for Network Intrusion Detection", J.B. D. Cabrera, B. Ravichandran & R. K. Mehra, Scientific Systems Company, 2000 IEEE.

"Kolmogorov Networks and Process Characteristic Input-Output Modes Decomposition", G. Dimirovski & Y Jing, 2002 IEEE.

Active Virtual Network Management Prediction: Complexity as a Framework for Prediction, Optimization and Assurance, S. Bush, General Electric Corporate Research & Development, 2002 IEEE.

US 5,748,741, 05/1998, Johnson et al. (withdrawn)

* cited by examiner

SYSTEM FOR INTRUSION DETECTION

RELATED APPLICATIONS

This application claims the benefit of U.S. Provisional Application No. 60/445,579, filed Feb. 7, 2003.

FIELD OF THE INVENTION

The present invention relates to a system for detecting intrusion to a wireless network, and more specifically, to a system for utilizing a complexity metric for detecting intrusion to a wireless network.

BACKGROUND OF THE INVENTION

Dynamically configurable ad-hoc wireless ad-hoc networks (DAHWN) are a form of Mobile Ad-hoc Network (MANET) that rely on active network technology for discovery and service adaptation. As with other MANETs, these networks present all of the difficult network security issues of Internet Protocol (IP) based networks augmented with additional challenges. Dynamic topology, reduced bandwidth, and need for low static infrastructure present opportunities for network intrusion. At the same time the self-adapting and self-healing attributes of DAHWN networks present potential increased cost for network intrusion as attackers may potentially exploit greater network capability.

Greater mobile ad-hoc network flexibility through self-healing and adaptive capabilities may provide increased network robustness. However, increased network capability, if exploited by opponents, offers both greater opportunity and cost of network intrusion with the challenges of detecting and resolving intrusions being more difficult.

Additionally, as a wireless network, DAHWN networks may be susceptible to link level attacks. The dynamic topology and mobility of nodes in DAHWN networks provide increased opportunity for node compromise and loss of trust. Policing of the network may also be more difficult since no physical boundary exists to provide firewall functionality.

The additional cooperation among nodes required in MANETs, as well as power of service migration, self healing, and auto configuration in an active network environment, make the loss of security potentially more damaging for DAHWN networks than traditional IP based networks. A compromised node may not be dependable as a router for neighboring nodes, and may cause severe disruption by migrating services in an inappropriate way.

Signature based intrusion detection schemes and other methods for ensuring security in traditional IP networks are more difficult in DAHWN environments due to the lack of boundaries with which to locate firewalls. Additional security methods are generally required to enable safe use and benefits of the active network technology in mobile ad-hoc environments.

Various means of achieving security on MANET networks have been conventionally utilized. While variants of existing security techniques may be necessary in securing ad hoc networks, the additional challenges faced by MANETs and DAHWNs require new and improved solutions.

SUMMARY OF THE INVENTION

A system in accordance with the present invention operates a wireless ad hoc network. The system includes a plurality of nodes and a plurality of protocols for governing transmission of data between the plurality of nodes. The operation of the protocols is quantified by a complexity metric for determining whether an external source has altered the operation of the system.

A computer program product in accordance with the present invention detects intrusions to a wireless ad hoc network. The computer program product includes a first instruction for operating a plurality of nodes with a plurality of protocols, a second instruction for governing transmission of data between the plurality of nodes, a third instruction for quantifying the operation of the protocols by a complexity metric, and a fourth instruction for determining whether an external source has altered the operation of the network.

A method in accordance with the present invention operates a network. The method includes the steps of: operating a plurality of nodes with a plurality of protocols; governing transmission of data between the plurality of nodes; quantifying the operation of the protocols by a complexity metric; and determining whether an external source has altered the operation of the network.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

The concept of conservation of complexity may provide for the secure operation of wireless networks. Information assurance may be achieved through objective monitoring of system algorithmic information theoretic behavior as compared to computed or observed norms. This method has been achieved by estimates of Kolmogorov Complexity utilized to objectively detect events across File Transfer Protocols (FTPS) simply from protocol header information. Compressing a protocol trace file using a compression algorithm and dividing by the original file size to form an inverse compression ratio may form a simple complexity estimate.

Figure 4:
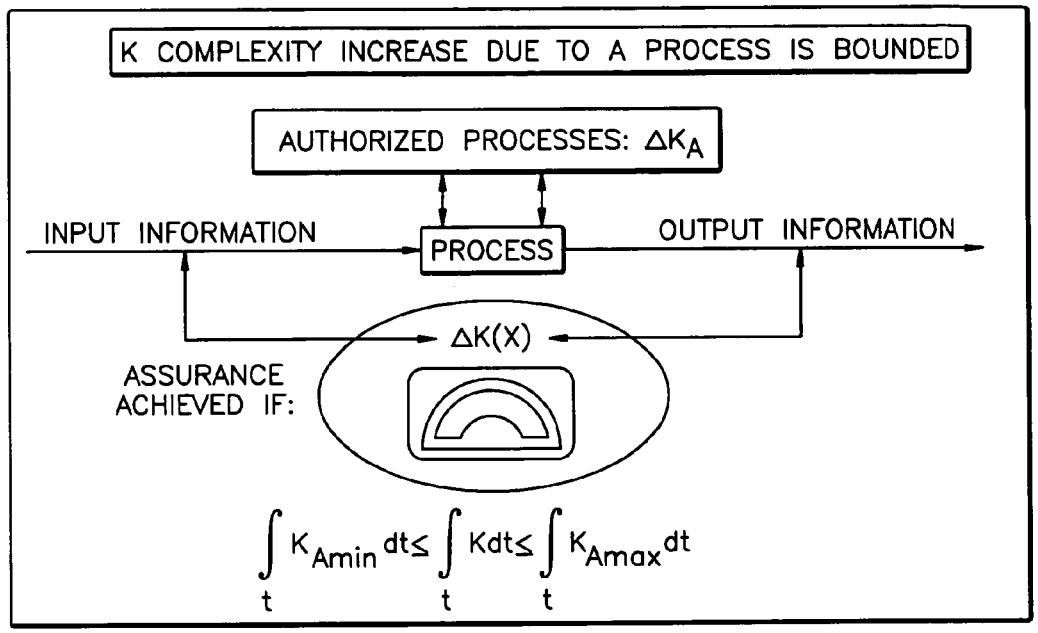
FIG. 4 is schematic representation of part of an example system in accordance with the present invention.

Complexity based detection of FTP events relies on the FTP protocol to enforce models that, when exercised as intended, are discernable from the misuse of these models. FIG. 4 illustrates an example state diagram for FTP commands. State diagrams, combined with a domain of possible user inputs, may produce a space of models that is permissible under the specification of the FTP.

The use of the principle of Conservation of Complexity may detect FTP events. The FTP specification places bounds on the space of models that may be observed in the behavior of the FTP. Complexity estimation of protocol header information is an estimate of the model taken from this conceptual model space. An interpretation of results reveals that complexity of the state machine or other model of the protocol leading to attack behavior is generally less than the complexity of the model or state machine reflecting healthy behavior.

Conventional results have provided validation that the principle of conservation of complexity may be used to objectively characterize information system behavior and detect anomalous behavior. Rather than post session analyses of protocol dump traces to determine if an event has already occurred, a preferred capability is real time event detection in accordance with the present invention. However, the smaller the data set, the more sensitive the complexity based analysis will be to estimator capabilities and data filtering decisions.

United States military operations have conventionally exploited technological advantages and engrained a deep technical understanding in every human operator. U.S. Navy nuclear propulsion plant operators, for example, understand intimately the physical laws that govern the operation of their equipment. This proficiency in thermodynamics and propulsion in our military stands in sharp contrast to the science of information assurance in conventional commercial or military operations. It would be entirely unacceptable if the first indication of a heat exchanger leak in a nuclear powered aircraft carrier or submarine would be a crewman noticing that a rat had crawled inside of an empty tank. The human operators would typically have previously noticed a pressure drop, or reduced heat transfer performance and temperature changes. The leak would have been identified and corrective action taken long before any real damage could have occurred to the crew, mission, or equipment. In contrast, many information security problems go unnoticed until extreme damage is done and an absurd result finally reveals the problem after the fact. The conventional information assurance domain has lacked the physics of information that would enable human operators to apply the same degree of diligence to their mission critical information networks that human operators apply to other mission critical systems.

Towards the goal of establishing a fundamental science of information assurance, Kolmogorov Complexity provides a fundamental property of information networks that may be used as a basic information parameter or metric from which to build laws and models of information network security. The advantage of using complexity as a fundamental parameter to monitor system health and achieve information security lies in its objectivity. Any given string within a system has a Kolmogorov Complexity without regard to the details of the system on which the string is executed. The operating system, protocol being used, and meaning of the data represented by a particular string, while related to string complexity, need not be known in order to measure string complexity. Kolmogorov Complexity is an inherent property of a string that may be used to determine information assurance in a way that is similar to the role played by parameters such as pressure, heat, and temperature in a thermodynamic system.

Further, the principle of conservation of complexity may be applied across network protocols as an objective means to benchmark normal behavior and detect abnormal behavior created by attacks to the network. The Kolmogorov Complexity (K(x)) of a string (x) is a measure of descriptive complexity contained in an object or string (x). Kolmogorov Complexity (K(x)) refers to the minimum length of a program that may generate the specific string (x). Kolmogorov Complexity is related to entropy, in that the expected value of K(x) for a random sequence is approximately the entropy of the source distribution for the process generating the sequence. However, Kolmogorov Complexity differs from entropy in that it relates to the specific string being considered rather than the source distribution. Kolmogorov Complexity may be described as follows, where $\Phi$ represents a universal computer (Turing machine), p represents a program and x represents a string:

$$K_\varphi(x) = \left\{ \min_{\varphi(p)=x} l(p) \right\}.$$

Random strings have relatively high Kolmogorov Complexity (i.e., on the order of their length), as patterns may not exist to reduce the size of a program generating such a string. On the other hand, strings with a large amount of structure have fairly low Kolmogorov Complexity. Universal computers may be equated through programs of constant length. A mapping may be constructed between universal computers of different types. Thus, the Kolmogorov Complexity of a given string on two computers differs by known or determinable constants.

A conditional Kolmogorov Complexity, K(y/x) of a string y given string x as input is described by the equation below:

$$K_\varphi(y/x) = \begin{cases} \min_{\varphi(p)=y} l(p) \\ \infty, \text{ if there is no } p \text{ such that } \varphi(p,x)=y \end{cases}$$

where l(p) represents a length of program (p) and $\Phi$ is a particular universal computer under consideration.

The major challenge of utilizing a Kolmogorov Complexity metric is that Kolmogorov Complexity is not computable. The length of any program that produces a given string is an upper bound on the Kolmogorov Complexity for that string. However, a lower bound may be computed.

As discussed above, exact measurement of Kolmogorov Complexity is not achievable. However, various methods of estimating complexity have been proposed. Conventional estimations of complexity include a class of universal compression techniques. One conventional estimation of complexity defines a measure of complexity for finite sequences rooted in the ability to produce these sequences from simple copy operations. Conventional universal compression algorithms harness these principles to yield compression algorithms that may approach the entropy of an infinite sequence produced by an ergodic, or statistically equal, source. Unix compress, for example, may be used as the compression estimation algorithm.

Conserved variables may enable the deduction of parameters from the presence or absence of other parameters. The Law of Conservation of Matter and Energy, for example, allows the deduction of how well a thermodynamic system is functioning without knowing every parameter in that thermodynamic system. Heat gain in one part of the thermodynamic system may be lost another part of the thermodynamic system. If the thermal efficiency of a thermodynamic system falls below certain thresholds, then there is a breakdown of the thermodynamic system.

On the other hand, if more heat is produced by a thermodynamic system than expected, an unintended process may be occurring. A similar situation may be desirable for information systems—the ability to detect lack of assurance by the presence of something unexpected, or the absence of something that is expected. This seems to be inaccessible given that information is easily created and destroyed with little residual evidence or impact.

However, since complexity of a given string may only change through computational operations, complexity is a conserved variable. If the exact Kolmogorov Complexity K(S) of a string of data S was available, this conserved parameter could be used to detect, resolve, or infer events that occur in the system (i.e., similar to the tracking of heat in a thermodynamic system enables monitoring of that system). Operations that affect string S and cause string S to gain or lose complexity may be accounted for, and an expected change in complexity should be resolvable with the known (secured) operations occurring in the information system to produce expected changes in complexity. Complexity changes that occur in a system that cannot be accounted for by normal system operations indicate unauthorized processes taking place. Thus, in the ideal case where Kolmogorov Complexity is known, a check and balance on an information system that enables assurance of proper operation and detection of unauthorized activity is possible. Unfortunately, (as previously discussed) a precise measure of Kolmogorov Complexity is not computable. An increase in Kolmogorov Complexity, however, may be determined.

Kolmogorov Complexity K(x) may be defined as a conserved parameter that changes through computational operations conducted upon strings. In order for K(x) to be a conserved parameter, changes in K(x) must be tracked. Two example theorems are presented below that enable bounds to be placed on the changes in K(x) that occur due to computational operations occurring in an information system. The two example theorems show bounds on the amount of complexity that may exist due to knowledge of other strings or computational operations:

1) Theorem 1: Bound on Conditional Complexity $K_\Phi(y \backslash x)\ K_\Phi(y)$ 2) Theorem 2: Bound on Complexity Increase Due to a Computational Operation $K_\Phi(y \backslash x, p)\ K_\Phi(x) + L(p)$ As shown and discussed above, while not computable from below, an upper bound on the increase in Kolmogrov Complexity may be crudely known by keeping track of the size of programs that affect data. This upper bound may be incredibly loose since it is quite possible to operate on a string and make it much less complex than the input. A method to recognize this simplification may be needed. However, these results provide a useful method for quantifying the "work" performed by a computational operation—the change in complexity introduced by the operation.

The principle of conservation of complexity may be applied to closed, as well as open, information systems in the same manner that thermodynamic principles are applied to closed or open systems. It is not necessary to maintain an account of every operation that takes place in an information system to utilize this principle. Expected complexity changes through authorized processes that are either mathematically determined or measured and benchmarked for healthy systems may be applied to various points in the information system in the same manner that temperature meters and mass flow indicators monitor the health of open thermodynamic systems at various points.

The principle of conservation of complexity is summarized in FIG. 4, where the complexity inherent in a stream of data over time falls within bounds determined by the authorized processes of the system or protocol. This principle may be applied to any process for which finite sets of authorized processes are known or measurable. An ideal application is in network protocols (i.e., where complexity is used to detect Distributed Denial Of Service (DDOS) attacks based on complexity of packet data). Without considering the data payload, the transport layer protocol alone may be evaluated. As information traverses across each layer of a network protocol stack and messages are exchanged according to the policies of the protocol, finite changes in complexity may occur. Expected behaviors may be either derived from the protocol rules and policies or measured and benchmarked for healthy systems.

The challenges in applying conservation of complexity to a protocol lie in both coordinating the timing aspects of the protocol and in dealing with the wide variation in operations inherent in normal protocol use. Packets traversing a protocol stack may be routed through different host computers. Thus, acknowledgements may be lost and retries may be attempted. However, from various points in the network, a stream or flow of data between two host ports may be measurable. A firewall is a logical place for this to take place, since routing ambiguity is lost. At a measurement point, timing aspects of the protocol may be tracked by simply concatenating session packets together into a single string. Two separate strings may be maintained—one for each direction, or a single combined string may be maintained. When concentrating on the protocol alone, the application specific data portion of the packets may be ignored (unless application behavior is well known) in order to restrict the operations that may occur on the data to a known and manageable set.

While networks are not closed systems, network protocols provide bounds on the operations and expected behavior that may or should occur when properly using a protocol. Wide variations in complexity will typically occur at the application layer. However, since the very nature and purpose of protocols is to enforce regularity, restricted complexity changes may occur in the normal use of protocols.

The principle of conservation of complexity applied to network protocols—using either calculated or measured norms—may thereby identify healthy behavior and attack behavior. Complexity metrics may thereby be applied to transport layer header information of FTP sessions to distinguish attack vs. normal protocol use. UNIX compress, for example, may be utilized to measure complexity. Complexity of protocol use in various attack scenarios is typically and discernibly less complex than normal FTP sessions.

To distinguish between typical FTP traffic and attack traffic, several typical FTP sessions may be specified using a variety of functions and tools. The following typical sessions may be specified: 1) incorrect login; 2) connected and left; 3) connected, looked for a file, and left; 4) output one file; 5) retrieved one file; 6) retrieved several files; 7) retrieved an entire directory; and 8) used a web browser to examine and obtain several files.

Results indicate that FTP sessions have predictable complexity. Complexity curves generated by this data are not linear initially, but approach a linear compression ratio of approximately 4:1 as the trace size increases. This could be due in part to the nature of conventional compression algorithms to reach asymptotic limits as file sizes increase—the uniqueness of individual protocol sessions is expected to be less measurable as session length increases. Before filters are applied, typical sessions had the same complexity as attacks. After filtering, the distinction between these two classes of connections became clearly discernible: attack sessions have less complexity as indicated by a higher compression ratio of 4.25:1 vs. healthy sessions with a compression ratio of 3.75:1. The curves are smooth and consistently show that attack sessions are more compressible, hence less complex than normal sessions.

Statistical analysis of data also confirms a significant difference between normal and attack complexity curves. A linear regression of log (compressed filtered trace size) vs. log (filtered trace size) on the attack series due to the exponential nature of the curves may be fitted. The F-statistic indicates a highly significant fit for which the p-value is less than 0.0001. The closest piece of normal traffic may differ from this attack model by 4 sigma (99.99%).

Several reasons may explain why FTP events are less complex at the protocol level than normal traffic. First, events tend to send more data to a server without analyzing the results. Second, standard applications are designed to be flexible, and attempt to negotiate protocol extensions if possible. This causes the session to be more complex. Third, designers of attack events tend to simplify the complexity, often combining steps. For instance, rather than sending the USER and PASS parameters in two packets, a designer may tend to use one request and one packet.

Results reveal a principle of conservation of complexity applied to network protocols that may objectively benchmark network health and identify network attack events. Strong distinctions exist between normal and attack complexity characteristics in FTP data sets when analyzing protocol-specific information that has been filtered to remove complexity noise unrelated to the protocol itself. Thus, protocols have predictable complexity curves. Complexity is conserved and falls within expected norms for normal protocol use. Different applications may have different curves, and the events have remarkably different complexity curves from normal traffic. Therefore, complexity estimates may distinguish between normal traffic and attack events.

Figure 2:
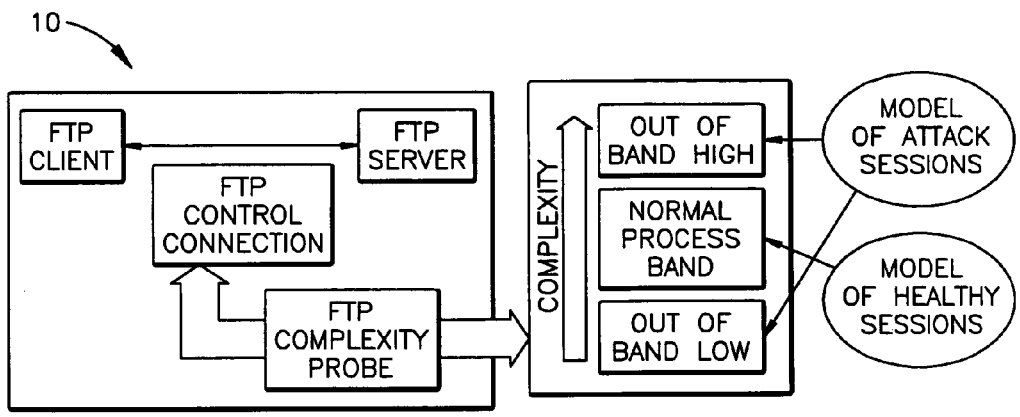
FIG. 2 is a schematic representation of an example system in accordance with the present invention.

A system 10 in accordance with the present invention monitors protocol control or header information of a wireless network, filters out unnecessary parameters, and applies a complexity estimation technique, such as compression, for detecting intrusion to the wireless network (FIG. 2). Normal complexity characteristics are benchmarked, and deviations from these norms are flagged as possible intrusions. Header and/or control information and/or argument data may also be monitored.

In addition, data may be gathered and compared across multiple sessions. For example, the most recent 100 sessions may be stored in a collection, and each new session can be appended to the collection. If the new session repeats the patterns of the previous session, the similarity, and therefore the complexity, is small. An unusual sequence of operations, when compared to previous sessions, would have high complexity.

The system 10 is objective in that knowledge about the specific function of the system is not required, only established norms for the correct use of protocols. The system may monitor one or more of the following: (1) network protocol information; (2) application control data; and (3) application argument information. The protocols may define control data as common data patterns, and application argument information may be data that is passed into and out of the system from external sources. An example of control data may include the use of key words and structures such as QUIT and GET. Protocols may contain control data as part of packets exchanged between two different systems. A detection algorithm may gather information from multiple points inside a computer, and merge this information.

The system 10 allows objective intrusion detection with reduced false alarms and minimal overhead. The overhead required may be managed by selective use of complexity estimation techniques. Because of conservation of complexity, an attacker may be able to make one layer of a protocol stack appear normal, but at the expense of other layers of the protocol stack. For example, with multiple sensors, an attacker may be able to deceive one of the sensors, but at the expense of increased (or decreased) complexity at another sensor. Therefore, a multi-level detection system in accordance with the present invention may detect attacks that a single "probe" will not. Because a measurement may occur at different places in a protocol stack, different measurements may be conducted with different techniques.

The system 10 may monitor application data by an application proxy process that does not have the ability to determine the contents of the packet headers. In addition, no attack dictionary is needed. Therefore, the system will work with new, undocumented, and heretofore unknown attack events.

Conventional implementations require a database of attack signatures that must remain up-to-date. These databases grow in size, requiring more CPU and disk space over time. For example, a conventional system may monitor the ASCII text stream of the protocol control channel rather than looking at protocol header information.

In order to facilitate real time intrusion detection, the system 10 in accordance with the present invention may, after each packet arrival, calculate a complexity estimate on the cumulative data for the session. No crossover of normal vs. attack curves typically occurs with a much wider separation of curves than conventional methods.

The use of control ASCII information rather than filtered protocol header information has two main advantages. First, a simple real time FTP event detection is possible through construction of a threshold value allowing some margin for error between a known normal vs. an attack curve. A minimum file size may be required to ensure enough data is available for the complexity estimator to distinguish behaviors.

Second, when utilizing ASCII control data from a FTP control channel, no filtering of fields is required in order to separate attack vs. healthy behavior. Filtering has, in essence, been applied merely by the selection of FTP control data as a good representation of the behavior enforced by the FTP specification under conservation of complexity principles.

Figure 3:
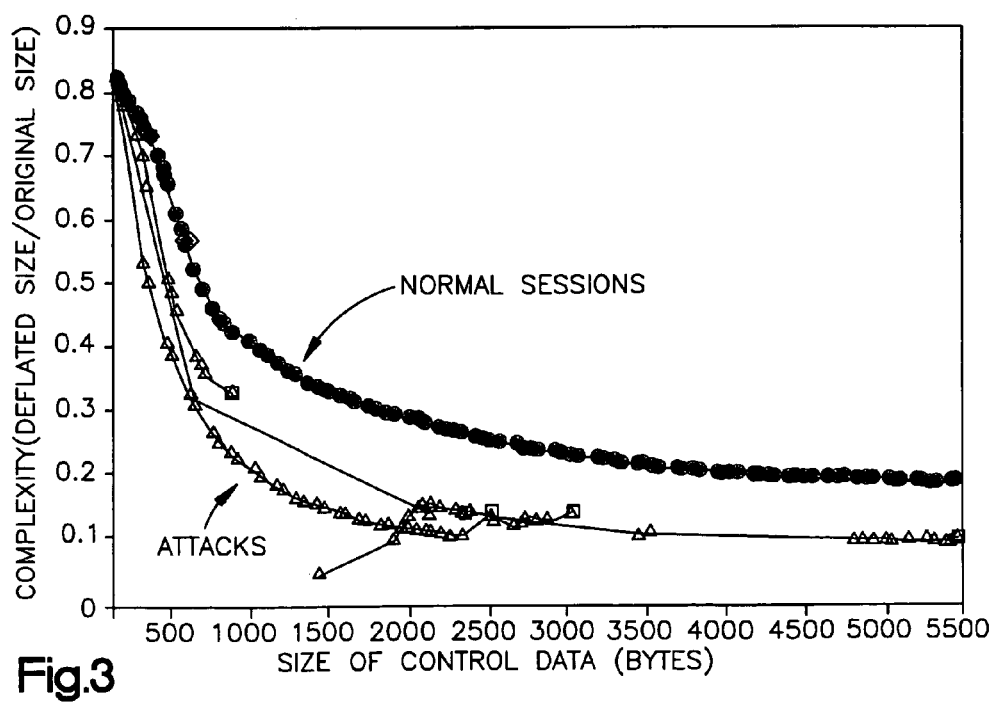
FIG. 3 is a schematic representation of example data generated by a system in accordance with the present invention.

Statistical regression analysis of data generated by the system illustrates that both attack and normal healthy session curves may be accurately estimated using power curves, as shown in FIG. 3. The power curve for normal session data may correspond to the below equation for control information size y and complexity estimates of x:

$$y = 25.186 x^{-0.5918}$$

The $R^2$ value of this data set and power curve is 0.997, indicating that only 0.3% of the variation in the "normal" session data set is not explained by the power curve. Assuming the variation around the regression curve is normal enables the selection of thresholds for intrusion detection that will minimize the possibility of false alarms based on the variance of the data not accounted for by the power curve.

The above discussion indicates that complexity estimation with appropriate thresholds may detect FTP events, although some false alarms may occur. One advantage of the system in accordance with the present invention is that a specific signature is not required for each type of event considered. The system may be improved by switching from the scalar mode of complexity comparison described above to a complexity distance test metric. A normalized complexity distance between data sets may be computed. Assume input string x, and control string y from a known model (a representative file or signature). The complexity distance d(x, y) is the normalized information distance between input string x and "typical for model" string y, which may be computed as follows:

$$d(x, y) = \frac{\max\{[Zlib(x, y) - Zlib(y)], [Zlib(y, x) - Zlib(x)]\}}{\max\{Zlib(x), Zlib(y)\}}$$

where x,y represents string x concatenated with string y. Computing the normalized information distance of an FTP trace session compared to a representative normal session file, and comparing this distance to a representative event file provides a mechanism to classify traffic more precisely than the simple scalar use of complexity described above.

Representative "Normal" and "Event" sessions may be created from the data. Multiple sessions may be used to categorize "normal" traffic. Example sessions may be categorized as (1) STOR a single file, (2) HELP, LIST, and RETR of files, (3) HELP, LIST, RETR of files. Two sessions may selected as "typical" events.

The use of normalized complexity distance may be more robust to false alarms and provides a potential method for more precise classification of events. Tiered approaches may also be used to minimize system overhead and include additional specific events or normal behavior.

MANET and DAHWN networks pose expanded and unique challenges to security that require improved techniques to overcome. Complexity Based Information Assurance in accordance with the present invention meets these challenges by enabling objective characterization of protocol data and detection of attack events without exhaustive signature detection. The coarse detection of FTP events based on scalar complexity metrics may be fine-tuned using normalized information distances.

Figures 5, 6:
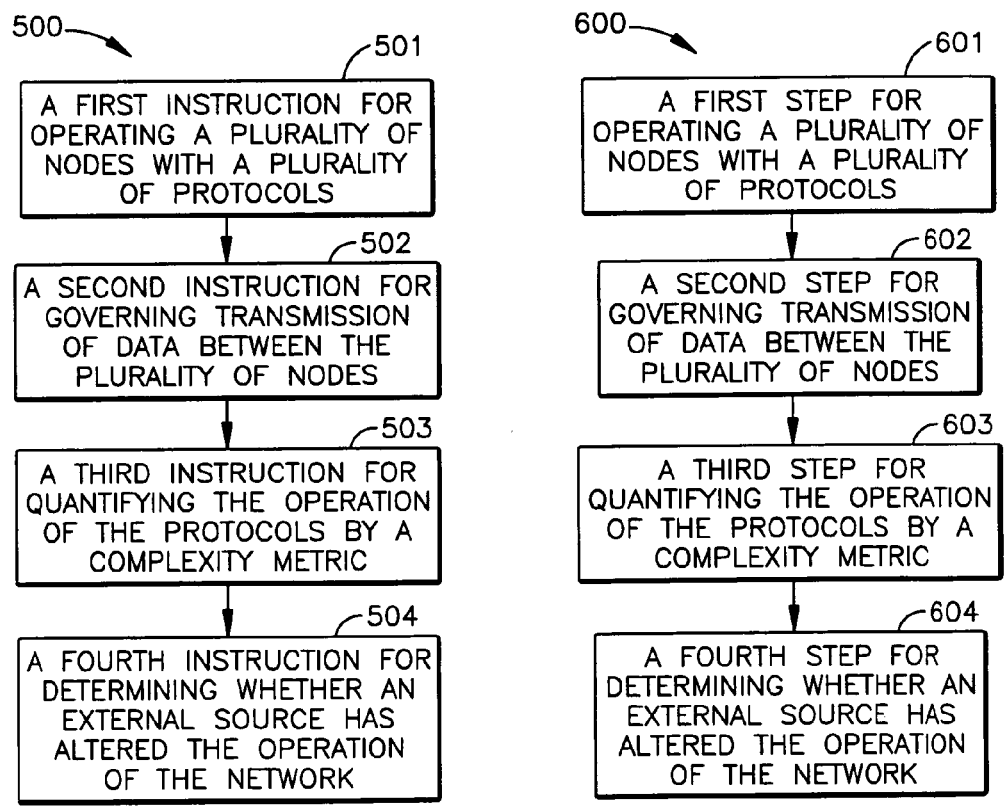
FIG. 5 is a schematic representation of another example system in accordance with the present invention.
FIG. 6 is a schematic representation of still another example system in accordance with the present invention.

In accordance with the present invention, a computer program product 500 detects intrusions to a wireless ad hoc network (FIG. 5). The computer program product 500 includes a first instruction 501 for operating a plurality of nodes with a plurality of protocols, a second instruction 502 for governing transmission of data between the plurality of nodes, a third instruction 503 for quantifying the operation of the protocols by a complexity metric, and a fourth instruction 504 for determining whether an external source has altered the operation of the network.

In accordance with the present invention, a method 600 operates a network (FIG. 6). The method 600 includes the steps of: operating 601 a plurality of nodes with a plurality of protocols; governing 602 transmission of data between the plurality of nodes; quantifying 603 the operation of the protocols by a complexity metric; and determining 604 whether an external source has altered the operation of the network.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

Figure 1:
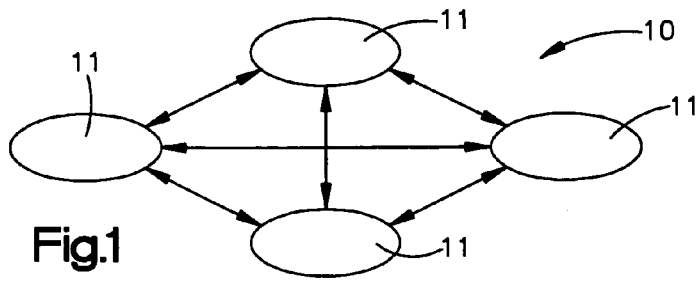
FIG. 1 is a schematic representation of a system for use with the present invention.

The server computer may operate in a networked environment using logical connections to one or more remote computers, such as a remote client computer. The remote computer may be a workstation, a server computer, a router, a peer device or other common network node 11 (FIG. 1), and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for operating a wireless ad hoc network, said system comprising:
    a plurality of nodes for transmitting data therebetween as governed by at least one of a plurality of protocols; and
    a complexity probe that quantifies a complexity of the transmissions of data with a complexity metric and determines from the quantified complexity whether an external source has altered the operation of the system, wherein a first complexity metric of a first protocol is compared to a first benchmarked complexity metric indicating normal operation of said first protocol, and wherein the first complexity metric of said first protocol is a Kolmogorov complexity metric.

2. The system as set forth in claim 1, wherein the first complexity metric deviates from the first benchmarked complexity metric by a first amount.

3. The system as set forth in claim 2 wherein the first amount is greater than a first predetermined amount, the operation of said first protocol thereby being altered by a first external source.

4. The system as set forth in claim 3 wherein a second complexity metric of a second protocol is compared to a second benchmarked complexity metric indicating normal operation of said second protocol, the second complexity metric deviating from the second benchmarked complexity metric by a second amount.

5. The system as set forth in claim 4 wherein the second amount is greater than a second predetermined amount, the operation of said second protocol thereby being altered by a second external source.

6. A computer readable medium comprising:
    a computer-usable data carrier storing instructions, the instructions when executed by a computer system causing the computer system to determine whether an external system has altered the operation of the computer system by executing the instructions to:
    quantify a complexity of at least one of a plurality of transmissions between nodes of the computer system with a complexity metric;
    determine from the quantified complexity whether an external source has altered the operation of the network; and
    compare a first complexity metric of a first protocol to a first benchmarked complexity metric indicating normal operation of the first protocol, wherein the first complexity metric of the first protocol is a Kolmogorov complexity metric.

7. The computer readable medium as set forth in claim 6 wherein the first complexity metric deviates from the first benchmarked complexity metric by a first amount.

8. The computer readable medium as set forth in claim 7 wherein the first amount is greater than a first predetermined amount, the operation of the first protocol thereby being altered by a first external source.

9. The computer readable medium as set forth in claim 6 further including a sixth instruction for comparing a second complexity metric of a second protocol to a second benchmarked complexity metric indicating normal operation of the second protocol, the second complexity metric deviating from the second benchmarked complexity metric by a second amount.

10. The computer readable medium as set forth in claim 9 wherein the second amount is greater than a second predetermined amount, the operation of the second protocol thereby being altered by a second external source.

11. A method for operating a network having a plurality of nodes, data transmission between the nodes being governed by at least one of a plurality of protocols, said method comprising:
    quantifying a complexity of the data transmissions between the nodes by a complexity metric; and
    determining whether an external source has altered the operation of the network based on the quantified complexity; and
    comparing a complexity metric of the data transmissions to a benchmarked complexity metric indicating normal operation of the protocol, wherein the complexity metric is a Kolmogorov complexity metric.

12. The method as set forth in claim 11, wherein the complexity metric deviates from the benchmarked complexity metric by a specified amount.

13. The method as set forth in claim 12 further comprising determining that the external source has altered operation of the network if the specified amount is greater than a predetermined amount.

* * * * *